[22.] W. H. DAVIS'

*Improved Tire.*

No. 118,846. Patented Sep. 12, 1871.

Attest: Inventor:
Henry Connett Jr William H. Davis
A. M. Jarrett

UNITED STATES PATENT OFFICE.

WILLIAM H. DAVIS, OF LEXINGTON, INDIANA.

IMPROVEMENT IN TIRES FOR WHEELS OF VEHICLES.

Specification forming part of Letters Patent No. 118,846, dated September 12, 1871.

*To all whom it may concern:*

Be it known that I, WILLIAM H. DAVIS, of Lexington, in the county of Scott and State of Indiana, have invented certain Improvements in Tires for Wheeled Vehicles, of which the following is a specification:

The primary object of this invention is to obviate the necessity of using bolts or rivets for securing the tire to the felly, and to add strength to said tire by the use of flanges formed with the same, and fitting closely to the sides of the felly. By the use of this form of tire great increase of strength over the ordinary kind is obtained without increase in the weight of metal. Tire-bolts, and the labor attendant upon their use, are dispensed with.

In a wheel as ordinarily constructed the tire adds but little to the strength of the felly, and the consequence is the wheels become flattened between the spokes, especially at the points where bolts are inserted. My tire, on the contrary, being provided with vertical flanges, which clasp the felly tight enough to compress the wood, add greatly to the strength and will tend greatly to preserve the rotundity of the wheel.

Figure 1:
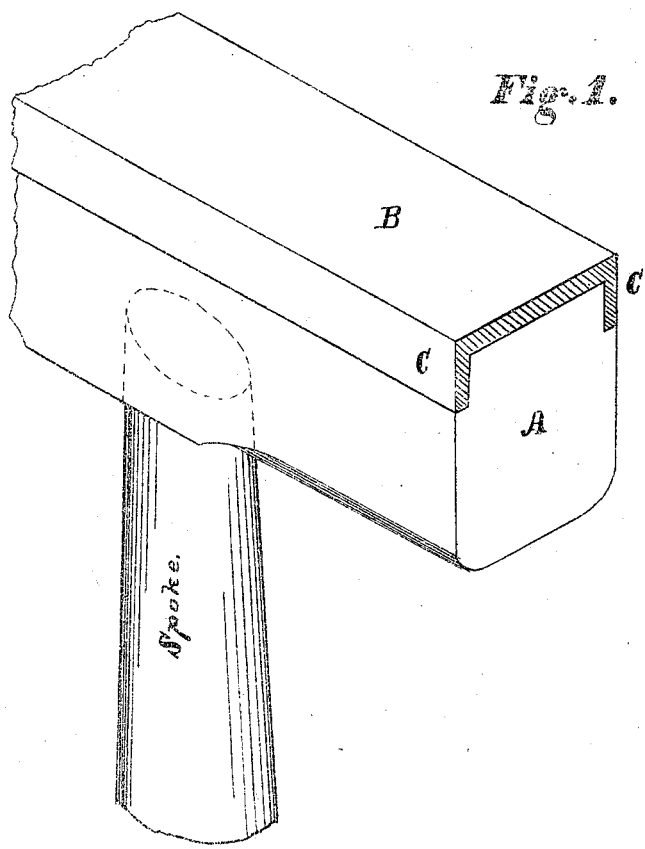
Figure 2:
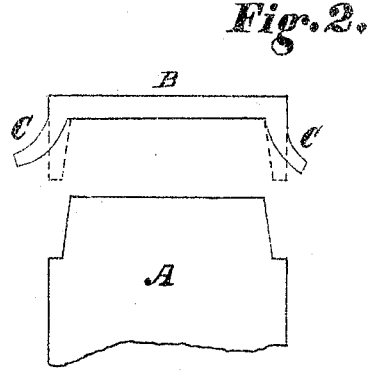

Figure 1 is an isometrical perspective view showing a section of the felly and tire secured thereto. Fig. 2 is an end view of the tire with the flanges curved outward, as they are before being applied to the wheel.

The same figure also shows the felly provided with rabbets to receive the tire-flanges.

In the drawing, A represents a felly of the ordinary kind rabbeted on the sides to receive the flanges C C of tire B. These flanges may be considerably thinner than the face of the tire, and, when in place, rest in rabbets cut in the felly for their reception, or the rabbets may be omitted and the flanges rest against the sides of the felly and project their thickness, but the plan shown is preferable.

When the tires are manufactured the flanges are curved considerably outward, as shown in Fig. 2, so that they can be applied to the wheel. After being shrunk on, the tire is passed between two rollers, which press the flanges in close to the wood, compressing the wood somewhat; also to prevent shrinkage. When made and put on in this way they will remain tight for a long time. An old tire of this kind may be cut and the flange recurved by flaring the end and passing it between suitable rollers. It may then be welded in the usual way.

This tire is especially adapted to light vehicles.

I claim—

The tire B provided with curved flanges C C, of substantially the form shown, and applied to the felly A, in the manner shown and for the purposes specified.

WILLIAM H. DAVIS.

Witnesses:
SOLOMON A. GREEN,
J. R. RUSSELL.